(12) United States Patent
Nagase et al.

(10) Patent No.: US 10,989,588 B2
(45) Date of Patent: Apr. 27, 2021

(54) SENSOR DEVICE

(71) Applicant: TLV CO., LTD., Hyogo (JP)

(72) Inventors: Mamoru Nagase, Kakogawa (JP); Akira Oizumi, Kakogawa (JP); Hajime Kosaka, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 20 days.

(21) Appl. No.: 16/727,841

(22) Filed: Dec. 26, 2019

(65) Prior Publication Data

US 2020/0149953 A1    May 14, 2020

Related U.S. Application Data

(63) Continuation of application No. PCT/JP2018/019047, filed on May 17, 2018.

(30) Foreign Application Priority Data

Jun. 29, 2017  (JP) .............................. JP2017-126962

(51) Int. Cl.
*G01H 11/08* (2006.01)
*G01H 1/00* (2006.01)
(52) U.S. Cl.
CPC .............. *G01H 11/08* (2013.01); *G01H 1/00* (2013.01)
(58) Field of Classification Search
CPC .... G01H 11/08; G01H 11/00; G01N 29/2437; G01N 29/2443; G01N 29/245;
(Continued)

(56) References Cited

U.S. PATENT DOCUMENTS

| 3,580,057 A | * | 5/1971 | Seegmiller | ............ | E21F 17/185 |
| | | | | | 73/597 |
| 4,827,771 A | | 5/1989 | Cary et al. | | |

(Continued)

FOREIGN PATENT DOCUMENTS

| EP | 3196612 A1 | 7/2017 |
| JP | S47-015988 Y1 | 6/1972 |

(Continued)

OTHER PUBLICATIONS

The extended European search report issued by the European Patent Office dated Jun. 5, 2020, which corresponds to European Patent Application No. EP18825519.4-1001 and is related to U.S. Appl. No. 16/727,841.

(Continued)

*Primary Examiner* — Suman K Nath
(74) *Attorney, Agent, or Firm* — Studebaker & Brackett PC

(57) ABSTRACT

A sensor device includes: a holder having an insertion hole; a probe having a proximal end to be inserted in the insertion hole and having a portion to be inserted in the insertion hole, a diameter of the portion of the probe to be inserted in the insertion hole being smaller than a hole diameter of the insertion hole; piezoelectric elements housed in the holder, configured to be brought into contact with the proximal end of the probe directly or indirectly, a vibration of the probe acting on the piezoelectric elements; an O-ring (prevention member) disposed in the insertion hole and holding the probe to prevent the probe from contacting the holder, the probe being configured such that a tip of the probe is pushed against a measurement object to detect a vibration of the measurement object.

2 Claims, 2 Drawing Sheets

(58) Field of Classification Search
CPC ....... B06B 1/0644; H01L 41/04; H01L 41/00; H01L 2224/75347
See application file for complete search history.

(56) References Cited

U.S. PATENT DOCUMENTS

| | | |
|---|---|---|
| 4,991,439 A | 2/1991 | Betts |
| 2017/0138982 A1* | 5/2017 | Bellaton ................... G01N 3/42 |
| 2017/0184444 A1* | 6/2017 | Yumoto ................... G01H 1/00 |

FOREIGN PATENT DOCUMENTS

| | | |
|---|---|---|
| JP | S53-085474 A | 7/1978 |
| JP | S61-017917 A | 1/1986 |
| JP | S62-168432 U | 10/1987 |
| JP | H07-229785 A | 8/1995 |
| JP | 5933144 B1 | 6/2016 |
| JP | 2016-125972 A | 7/2016 |
| KR | 20100069827 A | 6/2010 |
| WO | 2016043181 A1 | 3/2016 |

OTHER PUBLICATIONS

International Search Report issued in PCT/JP2018/019047; dated Jul. 31, 2018.

* cited by examiner

US 10,989,588 B2

SENSOR DEVICE

CROSS-REFERENCE TO RELATED APPLICATION

This is a continuation of PCT International Application PCT/JP2018/019047 filed on May 17, 2018, which claims priority to Japanese Patent Application No. 2017-126962 filed on Jun. 29, 2017. The disclosures of these applications including the specifications, the drawings, and the claims are hereby incorporated by reference in their entirety.

FIELD

The present application relates to a sensor device for detecting vibrations of a measurement object.

BACKGROUND

As described in Japanese Patent No. 5933144, for example, a known sensor device detects vibrations by pressing a part of the sensor device against a measurement object. In this sensor device, a proximal end of a probe is inserted in a holder, and in this holder, a piezoelectric element is kept in contact with the proximal end of the probe. In this sensor device, when a tip of the probe is pressed against a measurement object so that vibrations of the measurement object are transferred to the probe. The vibrations transferred to the probe act on the piezoelectric element as pressure variations to thereby cause voltage fluctuations. A signal concerning the voltage fluctuations is sent to a signal processing circuit, and vibrations of the measurement object are detected.

SUMMARY OF THE INVENTION

In the sensor device of Japanese Patent No. 5933144 described above, at some pressing angles of the probe against a measurement object, the probe might be tilted relative to the holder so that the probe can contact the holder in the insertion hole of the holder in which the probe is inserted. If the probe and the holder contact each other in an insertion hole, variations transferred to the probe from the measurement object attenuate. Accordingly, a detection value of vibrations differs between the case where the probe and the holder contact each other and the case where the probe and the holder do not contact each other, which causes a variation in the detection value.

The technique disclosed here has been made in view of the foregoing circumstances, and has an object of providing a sensor device capable of reducing variations in a vibration detection value.

A sensor device according to the present application includes a holder, a probe, a piezoelectric element, and a prevention member. The holder has an insertion hole. The probe has a proximal end to be inserted in the insertion hole and has a portion to be inserted in the insertion hole, and a diameter of the portion of the probe to be inserted in the insertion hole is smaller than a hole diameter of the insertion hole. The piezoelectric element is housed in the holder and configured to be brought into contact with the proximal end of the probe directly or indirectly, and a vibration of the probe acts on the piezoelectric element. The prevention member is disposed in the insertion hole and holds the probe to prevent the probe from contacting the holder, and the probe is configured such that a tip of the probe is pushed against a measurement object to detect a vibration of the measurement object.

The sensor device according to the present application can reduce a variation in a vibration detection value.

DESCRIPTION OF EMBODIMENTS

An embodiment of the present application will be described hereinafter with reference to the drawings. The following embodiment is merely a preferred example in nature, and is not intended to limit techniques disclosed in this application, applications, and use of the application.

Figure 1:
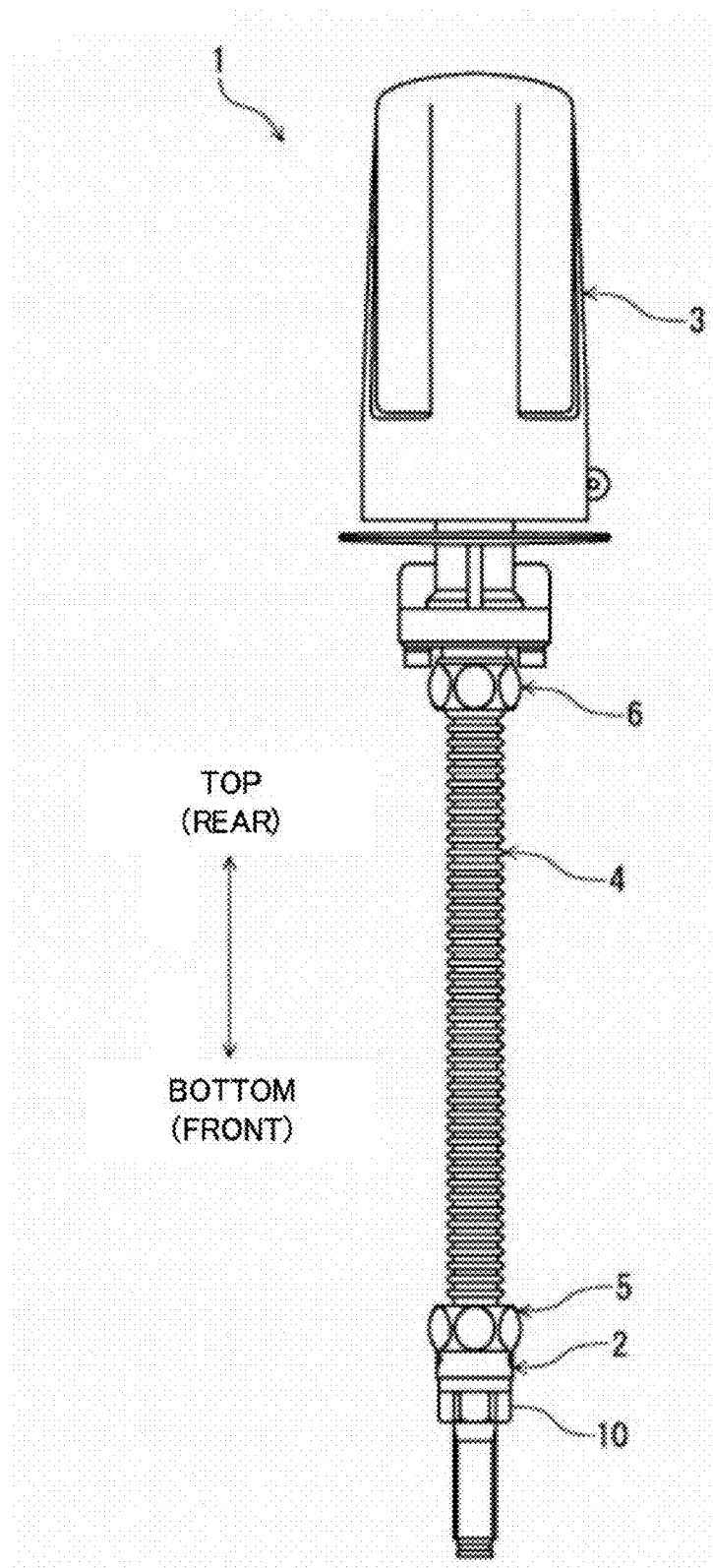
FIG. 1 is a front view illustrating a schematic configuration of a sensor device according to an embodiment.

A sensor device 1 according to this embodiment illustrated in FIG. 1 is a so-called fixed sensor that is coupled to an unillustrated fixing tool and fixed to a measurement object (e.g., a steam trap) to detect two parameters, that is, vibrations and a temperature, of the measurement object. The sensor device 1 is fixed to the measurement object while being in a vertical direction, for example.

The sensor device 1 includes a sensor body 2, an antenna 3, and a connection shaft 4. The connection shaft 4 is a hollow shaft and has both ends respectively coupled to the sensor body 2 and the antenna 3 with nuts 5 and 6. Although not shown, the antenna 3 incorporates a signal processing circuit and a transmitter, and receives signals concerning vibrations and the temperature of the measurement object detected by the sensor body 2.

Figure 2:
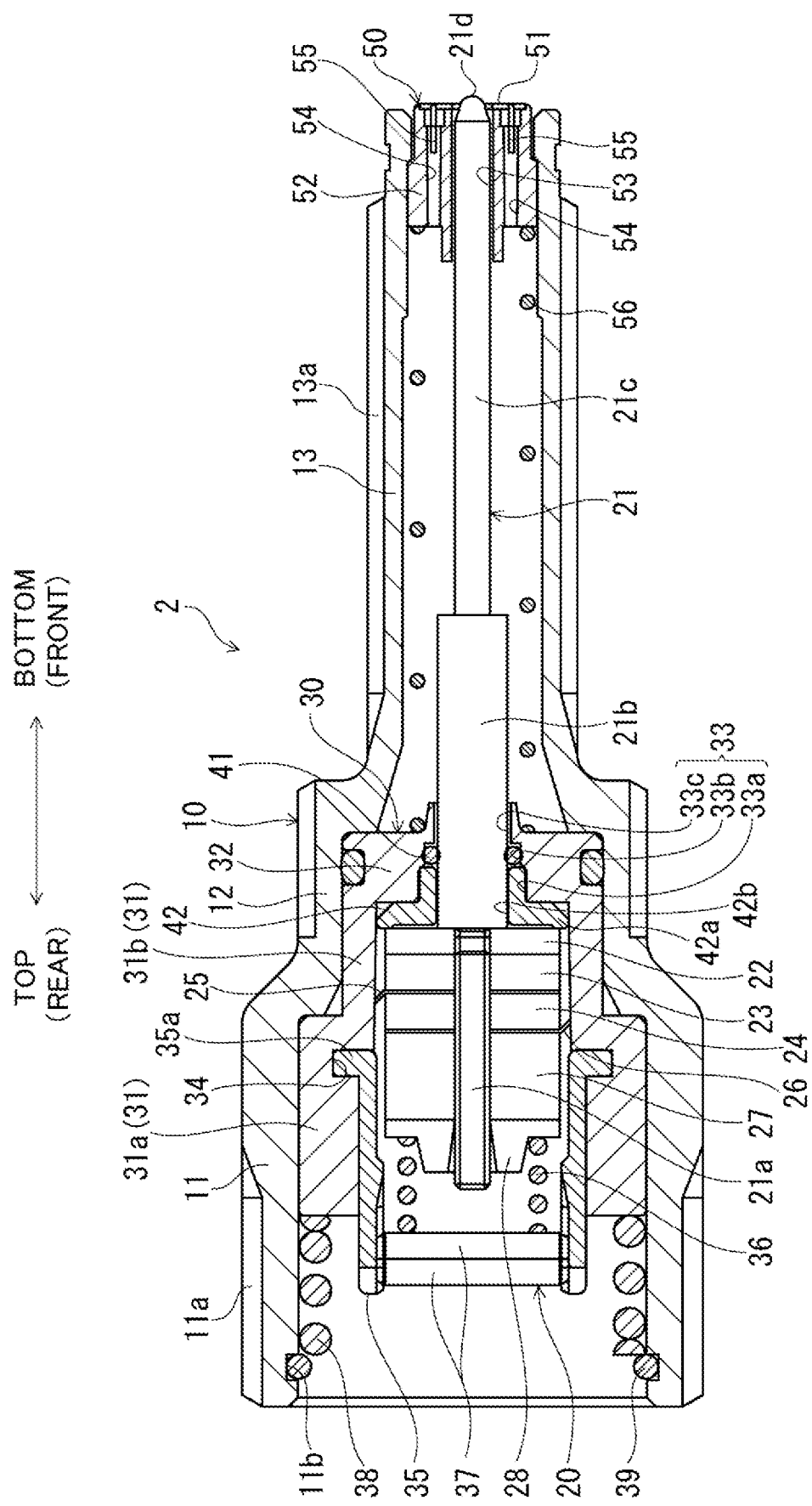
FIG. 2 is a cross-sectional view illustrating a schematic configuration of a sensor body according to the embodiment.

As illustrated in FIG. 2, the sensor body 2 includes a casing 10, a vibration detecting unit 20, and a temperature detecting unit 50 (thermocouple unit).

The casing 10 has a substantially cylindrical shape, and includes a large diameter part 11, an intermediate diameter part 12, and a small diameter part 13. The outer peripheral surface of the large diameter part 11 has an external thread part 11a to which the nut 5 described above is fastened. The outer peripheral surface of the small diameter part 13 has an external thread part 13a that is fastened to the fixing tool described above.

The vibration detecting unit 20 is configured to be inserted in the casing 10 and detect (measure) vibrations of the measurement object. The vibration detecting unit 20 includes a probe 21, a transfer plate 22, piezoelectric elements 23 and 24, electrode plates 25 and 26, a weight 27, an anti-vibration rubber 28, a holder 30, a fixing member 35, a coil spring 36, and a cap 37.

The probe 21 is a slender rod member, and includes a thread part 21a, a large diameter part 21b, and a small diameter part 21c arranged in this order from the rear (from the proximal end). The thread part 21a has a diameter smaller than that of the large diameter part 21b, and an external thread is formed on the outer peripheral surface of the thread part 21a. The small diameter part 21c has an outer diameter smaller than that of the large diameter part 21b. The probe 21 is disposed coaxially with the casing 10, and has a tip 21d projecting from the casing 10.

The holder 30 is constituted by a resin of a substantially bottomed cylindrical shape, and is disposed coaxially with the casing 10. The holder 30 includes a large diameter part 31a and a small diameter part 31b having different diameters of side walls 31 and arranged in this order from the rear. The holder 30 has a bottom wall 32 in which an insertion hole 33 is formed, and the proximal end of the probe 21 is inserted in the insertion hole 33. That is, in the probe 21, the entire thread part 21a is located in the holder 30, and the large diameter part 21b is partially located in the insertion hole 33.

The transfer plate 22, the first piezoelectric element 23, a first electrode plate 25, a second piezoelectric element 24, a second electrode plate 26, a weight 27, and the anti-vibration rubber 28 are inserted in the thread part 21a of the probe 21 while being in contact with one another and arranged in this order from the large diameter part 21b. That is, the piezoelectric elements 23 and 24 are in contact with an end face (proximal end) of the large diameter part 21b of the probe 21 indirectly with the transfer plate 22 interposed therebetween. The transfer plate 22 is screwed to the thread part 21a while being in contact with the end face of the large diameter part 21b. The piezoelectric elements 23 and 24 and the electrode plates 25 and 26 are inserted while not screwed to the thread part 21a. The weight 27 is screwed to the thread part 21a while being in contact with the electrode plate 26. The anti-vibration rubber 28 is inserted while being in contact with the weight 27 and not screwed to the thread part 21a. The transfer plate 22, the piezoelectric elements 23 and 24, the electrode plates 25 and 26, the weight 27, and the anti-vibration rubber 28 are housed in the holder 30 while not in contact with the side wall 31 of the holder 30.

Although not shown, each of the two electrode plates 25 and 26 is connected to the signal processing circuit of the antenna 3 by a signal line. That is, the signal line extends from the sensor body 2 to the inside of the antenna 3 through the connection shaft 4.

The fixing member 35 is a member to which the cap 37 is attached. The fixing member 35 has a cylindrical shape, and has tabs 35a. The tabs 35a project radially outward from an end portion of the fixing member 35. The plurality of tabs 35a are arranged along the circumference of the fixing member 35. A groove 34 is formed in the inner peripheral surface of the large diameter part 31a of the holder 30. The groove 34 extends along the circumference of the large diameter part 31a. The fixing member 35 is inserted in the large diameter part 31a of the holder 30, and is attached to the holder 30 by fitting the tabs 35a in the groove 34 of the large diameter part 31a.

An internal screw to which the cap 37 is screwed is provided in the inner peripheral surface of the fixing member 35. The cap 37 is a disc-shaped member whose outer peripheral surface is provided with an external thread, and is fixed to the fixing member 35 by screwing to the inner peripheral surface of the fixing member 35. In the fixing member 35, the weight 27 and the anti-vibration rubber 28 are located while not contact with the fixing member 35. In the fixing member 35, the coil spring 36 is disposed between the anti-vibration rubber 28 and the cap 37. The coil spring 36 has one end in contact with the anti-vibration rubber 28 and the other end in contact with the cap 37.

The coil spring 36 biases the anti-vibration rubber 28 forward to thereby push the piezoelectric elements 23 and 24 and the electrode plates 25 and 26 against the transfer plate 22. A biasing force of the coil spring 36 is adjusted by a screwing depth of the cap 37. The weight 27 pushes the piezoelectric elements 23 and 24 and the electrode plates 25 and 26 against the transfer plate 22 by using a screw tightening force. As described above, the weight 27, the coil spring 36, and the cap 37 constitute a push member that pushes the piezoelectric elements 23 and 24 and the electrode plates 25 and 26 against the transfer plate 22 from the rear.

In this manner, the piezoelectric elements 23 and 24 are pushed against the transfer plate 22 by a predetermined force (initial pressing force) with the push member. Consequently, even when vibrations and a force of a material except for those of the measurement object are applied to the piezoelectric elements 23 and 24 as disturbance, this disturbance can be absorbed and the influence of the disturbance can be eliminated.

The sensor body 2 includes a coil spring 38 for biasing the vibration detecting unit 20 forward. The vibration detecting unit 20 is inserted in the casing 10 to be movable in the axial direction (i.e., front-rear direction) of the casing 10. The coil spring 38 is housed in the large diameter part 11 of the casing 10, and is disposed rearward of the vibration detecting unit 20. An end of the coil spring 38 is supported by a snap ring 36. The snap ring 36 is fitted in a groove 11b formed in the inner surface of the large diameter part 11 of the casing 10, and receives the end of the coil spring 38. On the other hand, the other end of the coil spring 38 is in contact with the holder 30 of the vibration detecting unit 20. The coil spring 38 is configured to bias the holder 30 forward to thereby bias the vibration detecting unit 20 forward so that the tip 21d of the probe 21 projects from the casing 10.

The temperature detecting unit 50 includes a contact plate 51 (heat transfer plate), a holding member 52, and thermocouple wires 55, and detects (measures) a temperature of a measurement object. The contact plate 51 is a substantially annular plate member. The holding member 52 holds the contact plate 51. The holding member 52 has a substantially cylindrical shape, and is housed (inserted) in a front end portion of the small diameter part 13 of the casing 10. The contact plate 51 is held by the tip of the holding member 52.

The holding member 52 has one probe hole 53 extending axially and two thermocouple holes 54 each extending axially. The probe hole 53 is a through hole formed in the center of the holding member 52, and the small diameter part 21c of the probe 21 is inserted in the probe hole 53. The two thermocouple holes 54 are through holes that are shifted 180° from each other with respect to the probe hole 53, and two thermocouple wires 55 are provided to the thermocouple holes 54. Each of the two thermocouple wires 55 has one end connected to the contact plate 51 and the other end connected to the signal processing circuit of the antenna 3 though not shown. In the casing 10, a coil spring 56 that biases the holding member 52 toward the tip of the casing 10 is provided.

An O-ring 41 for elastically holding the probe 21 is also provided in the insertion hole 33 of the holder 30. The insertion hole 33 is constituted by three parts having different hole diameters. Specifically, in the insertion hole 33, a large diameter part 33a, an intermediate diameter part 33b, and a small diameter part 33c are continuously formed in this order from the rear (from the inner side of the holder 30). The hole diameter of the intermediate diameter part 33b is larger than the hole diameter of the small diameter part 33c and is smaller than the hole diameter of the large diameter part 33a. The hole diameter of the small diameter part 33c is larger than the outer diameter of the large diameter part 21b of the probe 21. That is, the diameter of a portion of the probe 21 inserted in the insertion hole 33 (large diameter part 21b) is smaller than the hole diameter of the insertion hole 33. The large diameter part 33a and the intermediate diameter part 33b correspond to a holding part recited in claims of the present application.

The O-ring 41 is an annular elastic member, and is disposed between the large diameter part 21b of the probe 21 and the insertion hole 33. The O-ring 41 is disposed at the intermediate diameter part 33b of the insertion hole 33. The inner peripheral side of the O-ring 41 is in contact with the outer peripheral surface of the large diameter part 21*b*, and the outer peripheral side of the O-ring 41 is in contact with the inner peripheral surface of the intermediate diameter part 33*b*. Although not shown, an O-ring groove in which the outer peripheral side of the O-ring 41 is fitted is formed in the inner peripheral surface of the intermediate diameter part 33*b*. In this manner, the O-ring 41 elastically holds the probe 21 in the insertion hole 33.

The insertion hole 33 of the holder 30 is provided with a lid 42. The lid 42 has a cylindrical shape formed coaxially with the insertion hole 33, and a flange 42*a* is provided at an inner end of the lid 42. The flange 42*a* projects radially outward from the outer peripheral surface of the cylindrical portion. The outer diameter of the lid 42 is substantially equal to the hole diameter of the large diameter part 33*a* of the insertion hole 33. The diameter (i.e., inner diameter) of a hole 42*b* of the lid 42 is larger than the outer diameter of the large diameter part 21*b* of the probe 21. The lid 42 is inserted in the large diameter part 33*a* of the insertion hole 33 from the inner side to thereby prevent detachment of the O-ring 41 from the insertion hole 33.

As described above, in the vibration detecting unit 20, the large diameter part 21*b* of the probe 21 is inserted in the insertion hole 33 of the holder 30 and the lid 42. A given gap is present between the large diameter part 21*b* of the probe 21 and the small diameter part 33*c* of the insertion hole 33, and a given gap is also present between the large diameter part 21*b* of the probe 21 and the lid 42. The transfer plate 22 is in contact with the flange 42*a* of the lid 42.

In this embodiment, the O-ring 41 constitutes a prevention member that prevents the probe 21 from contacting the holder 30 and the lid 42 even when the probe 21 tilts with respect to the insertion hole 33. In other words, the O-ring 41 elastically holds the probe 32 while following a tilt of the probe 21, and restricts the tilt of the probe 21 to prevent the probe 21 from contacting the holder 30 and the lid 42.

In the sensor device 1 described above, the probe 21 is pushed by pushing the tip 21*d* of the probe 21 against the measurement object so that mechanical vibrations of the measurement object are transferred to the probe 21. The vibrations transferred to the probe 21 act on the piezoelectric elements 23 and 24 through the transfer plate 22. Specifically, vibrations of the probe 21 act on the piezoelectric elements 23 and 24 as pressure vibrations. Accordingly, voltage fluctuations occur in the piezoelectric elements 23 and 24, and a signal concerning these voltage fluctuations is sent from the electrode plates 25 and 26 to the signal processing circuit of the antenna 3 through signal lines so that vibrations of the measurement object are detected.

The probe 21 can tilt with respect to the holder 30 at some pushing angles of the probe 21 against the measurement object. In this case, the O-ring 41 prevents the large diameter part 21*b* of the probe 21 from contacting the holder 30 and the lid 42. In the sensor device 1, heat (high-temperature heat) of the measurement object is transferred to the contact plate 51 so that a potential difference occurs between the two thermocouples 55 A signal concerning this potential difference is sent to the signal processing circuit of the antenna 3, and the temperature of the measurement object is detected. That is, the temperature detecting unit 50 according to this embodiment is brought into contact with the measurement object by pushing the probe 21, and detects the temperature of the measurement object. Values of the vibrations and temperature of the measurement object thus detected are wirelessly transmitted from a transmitter of the antenna 3 to another receiver (not shown).

As described above, the sensor device 1 according to this embodiment includes the O-ring 41 (prevention member) disposed in the insertion hole 33 and holding the probe 21 to prevent the probe 21 from contacting the holder 30. Thus, even when the probe 21 tilts with respect to the holder 30 at some pushing angles of the probe 21 against the measurement object, it is possible to prevent the probe 21 from contacting the holder 30. Accordingly, it is possible to reduce variations in the detection value, that is, a difference in the detection value of variations between the case where the probe 21 and the holder 30 contact each other and the case where the probe 21 and the holder 30 do not contact each other.

In the sensor device 1 of this embodiment, the prevention member is an annular elastic member disposed between the probe 21 and the insertion hole 33 and configured to contact the outer peripheral surface of the probe 21 and the inner peripheral surface of the insertion hole 33. With this configuration, the probe 21 can be elastically held while following a tilt of the probe 21, and the tilt of the probe 21 can be restricted to prevent the probe 21 from contacting the holder 30.

The insertion hole 33 includes the holding part (intermediate diameter part 33*b*) provided with the O-ring 41 (prevention member) and the small diameter part 33*c* continuous to the outer side of the holding part (intermediate diameter part 33*b*) and having a hole diameter smaller than that of the holding part (intermediate diameter part 33*b*). The sensor device 1 includes the lid 42 having a cylindrical shape whose inner diameter is larger than that of a portion of the probe 21 inserted in the insertion hole 33 (large diameter part 21*b*). The lid 42 is inserted in the holding part (large diameter part 33*a*) of the insertion hole 33 from the inner side, and prevents detachment of the O-ring 41 (prevention member) from the insertion hole 33. The O-ring 41 (prevention member) is configured to prevent the probe 21 from contacting the lid 42.

With the configuration described above, detachment of the O-ring 41 from the insertion hole 33 can be prevented, and a variation in the detection value, that is, a difference in the detection value of vibrations between the case where the probe 21 and the lid 42 contact each other and the case where the probe 21 and the lid 42 do not contact each other, can be reduced.

In the sensor device 1 according to the embodiment, the O-ring 41 is used as the prevention member. Thus, the function of preventing the probe 21 from contacting the holder 30 and the lid 42 can be easily obtained.

The O-ring 41 is made of a resin, and has a specific acoustic impedance significantly different from that of the metal probe 21. Thus, the effect of attenuating vibrations caused by constant contact of the probe 21 with the O-ring 41 is small. Thus, vibrations can be detected relatively accurately.

OTHER EMBODIMENTS

In the sensor device 1 according to this embodiment, the insertion hole 33 of the holder 30 is constituted by the three parts having different hole diameters. However, the technique disclosed in the present application is not limited to this embodiment, and the hole diameter of the insertion hole 33 may be uniform across the entire insertion hole 33. The insertion hole 33 may be constituted by two parts having different hole diameters. In this case, the O-ring 41 is disposed in the part having a larger hole diameter.

Although the above embodiment is directed to the sensor device 1 fixed to a measurement object and used for measuring vibrations and other parameters of the measurement object, the technique disclosed in this application can also obtain similar advantages for a handy type sensor device 1 that is pushed against a measurement object by hand of an operator for measurement.

The sensor device 1 according to the present application may detect only vibrations of a measurement object without the temperature detecting unit 50.

The technique disclosed in the present application is useful for a sensor device that detects vibrations of a measurement object by pushing a probe against the measurement object.

What is claimed is:

1. A sensor device comprising:
    a holder having an insertion hole;
    a probe having a proximal end to be inserted in the insertion hole and having a portion to be inserted in the insertion hole, a diameter of the portion of the probe to be inserted in the insertion hole being smaller than a hole diameter of the insertion hole;
    a piezoelectric element housed in the holder and configured to be brought into contact with the proximal end of the probe directly or indirectly, a vibration of the probe acting on the piezoelectric element; and
    a prevention member disposed in the insertion hole and holding the probe to prevent the probe from contacting the holder, the probe being configured such that a tip of the probe is pushed against a measurement object to detect a vibration of the measurement object, wherein
    the prevention member is an annular elastic member disposed between the probe and the insertion hole and configured to be brought into contact with an outer peripheral surface of the probe and an inner peripheral surface of the insertion hole,
    the insertion hole includes a holding part provided with the prevention member and includes a small diameter part continuous to an outer side of the holding part and having a hole diameter smaller than a diameter of the holding part,
    the sensor device includes a lid having a cylindrical shape whose inner diameter is larger than a diameter of the portion of the probe to be inserted in the insertion hole, the lid is configured to be inserted in the holding part of the insertion hole from an inner side and to prevent detachment of the prevention member from the insertion hole, and
    the prevention member is configured to prevent the probe from contacting the lid.

2. The sensor device according to claim 1, wherein the prevention member is an O-ring.

* * * * *